United States Patent [19]

Powell et al.

[11] 3,797,624
[45] Mar. 19, 1974

[54] CONVEYER GUIDE

[75] Inventors: Johnnie L. Powell, Turlock; Carl L. Doyle, Modesto, both of Calif.

[73] Assignee: Mandrel Industries, Inc., Houston, Tex.

[22] Filed: Jan. 13, 1972

[21] Appl. No.: 217,551

[52] U.S. Cl.............. 193/25 R, 193/38, 193/43 A
[51] Int. Cl............................................. B65g 11/10
[58] Field of Search................ 193/43 A, 38, 25 R; 198/33 AC

[56] References Cited
UNITED STATES PATENTS

| | | | |
|---|---|---|---|
| 3,077,969 | 2/1963 | Raffe | 193/38 |
| 880,144 | 2/1908 | Johnson | 193/43 A |
| 1,320,993 | 11/1919 | Townsend | 193/43 A |
| 3,331,486 | 7/1967 | Towry | 198/33 AC |
| 331,909 | 12/1885 | Price | 193/43 A UX |
| 492,034 | 2/1893 | Livingston | 193/43 A X |
| 1,436,549 | 11/1922 | Tibbits | 193/43 A |
| 2,800,211 | 7/1957 | Madden | 193/43 A X |

*Primary Examiner*—Evon C. Blunk
*Assistant Examiner*—W. Scott Carson
*Attorney, Agent, or Firm*—Arnold, White & Durkee

[57] ABSTRACT

For articles such as rectangular or cylindrical containers or cans, a conveyor guide of the chute type has a number of parallel rails affixed to transverse rib members at intervals along the path of the articles, the ribs in one example being hoop-like rectangular frames arrayed to enclose the moving articles with rails on all the lateral sides. The rails are affixed by means of clamping fasteners each of which is secured to the adjacent rib by a bolt piercing the rib normal to the direction of the path. The fastener can rotate on the bolt so as to permit alignment of the rail at an angle to the rib. Thus at bends in the path, or places where the guide twists to change the vertical orientation of the articles, the rails may be smoothly curved to conform to the path without crimping at the fasteners. The rails are made of springy resilient material to assist this effect. The fasteners are relieved, at least on the side facing the ribs, to improve the clamping effect when the bolts are tightened.

4 Claims, 5 Drawing Figures

PATENTED MAR 19 1974　3,797,624
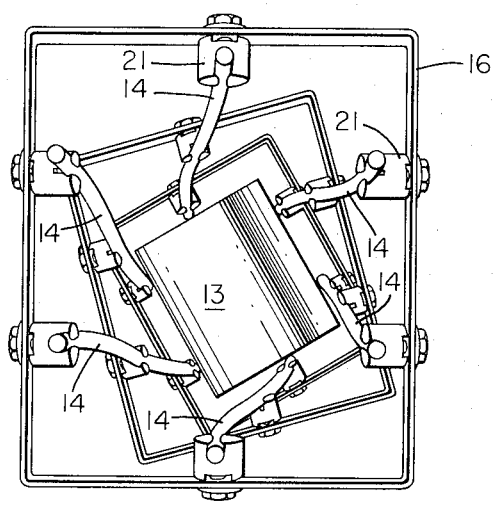
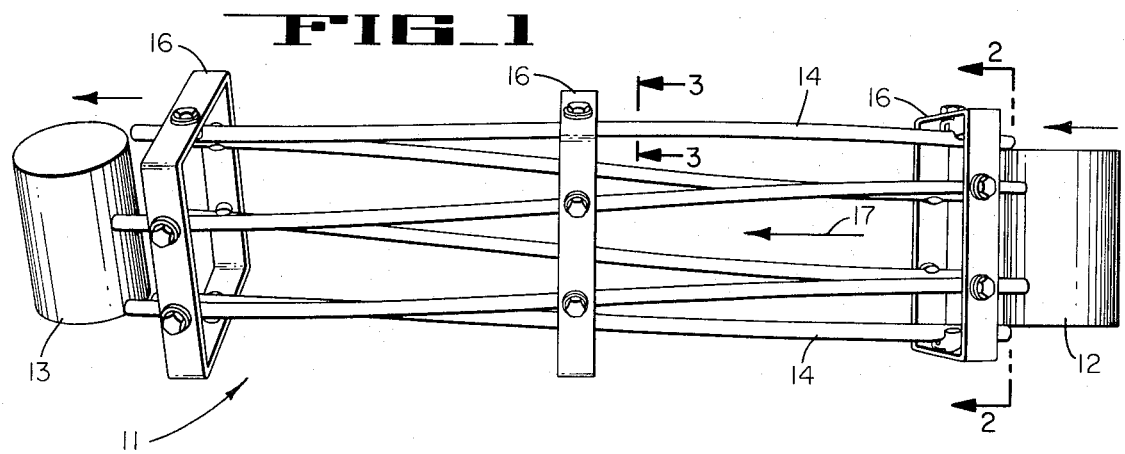
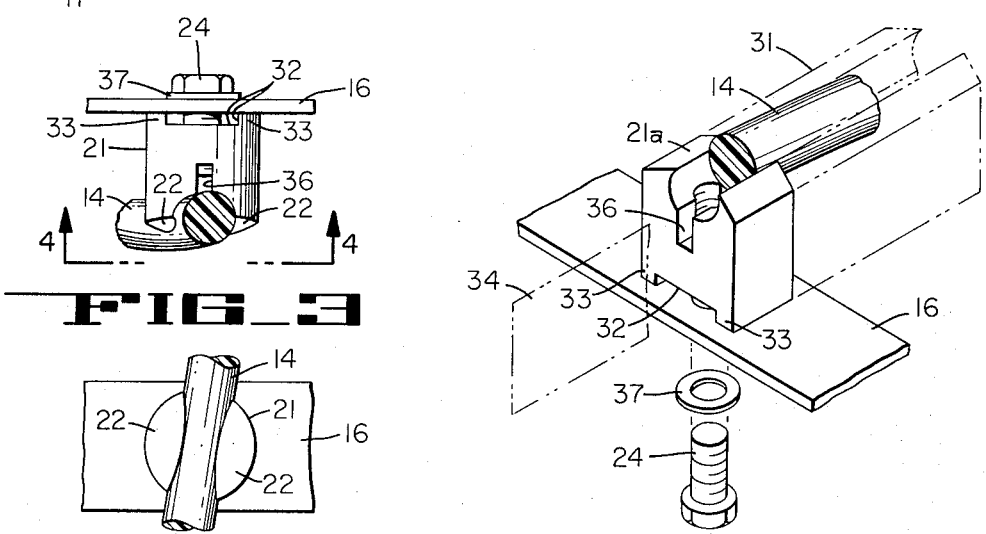
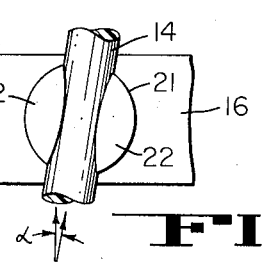

CONVEYER GUIDE

FIELD OF THE INVENTION

The present invention relates to article conveyors of the chute type and particularly to rail guides therefor.

Previously in the art, chute-like rail guides for articles such as cans in a cannery have been made of stainless steel rods of circular cross section, supported and aligned to closely parallel the path of the cans and to engage at least one and usually all four lateral sides of the moving can as frictionlessly as possible. The support and alignment means has usually been a number of hoop-like rectangular frame or rib members affixed to the outer sides of the rods, remote from the cans, at intervals along the path. The rods are generally welded directly to the ribs. Where the path bends, or where the guide twists to change the vertical orientation of the cans, the rods must all be painstakingly and individually bent by hand to form a smooth curve, and the curves of all (usually six) rods must be adjusted to perpetuate the correct transverse spacing corresponding to the transverse dimensions of the can. If the transverse rod spacing is too great, the moving cans may tumble over and continue in axial alignment down the chute instead of upright, fouling the next machinery in the production line and damaging the can. If the transverse rod spacing is too small, the cans may stick or be slowed in the chute and jam. The provision of correct spacing at bends and twists, where the rod curves are three-dimensional, requires high skill and time-consuming labor, and in many canneries one worker is assigned on full-time duty to continuously correct the curves and spacing of the rods, working with a pair of spanner type bending tools.

During the original installation, other difficulties are to be overcome in that the curved portions of the rods, or the tangents thereto, often should not be normal to the plane of the rib frame if the correct curve is to be achieved, but should cross the rib at an angle. In making twists in the prior art however, the welds must be made with the entire chute assembled and adjusted as a straight chute before twisting. A form or jig is often used for twists, consisting of, say, half-inch-thick plywood templates for the rods, abutted face to face and bolted at the center by a long bolt following the axis of the twist. With this form, the rods and frames may be assembled and twisted as an assembly after welding; but even with this form the soft steel rods will not bend to smooth curves, but instead will crimp or kink at the ribs.

An additional difficulty is that although the rods are made of stainless steel to resist wear and corrosion from food and liquids, some of them nevertheless eventually do corrode and wear to the degree that they must be replaced. In such event, the entire chute must be replaced, for it is virtually impossible to remove a single steel rod and to install another, in an already formed chute section, particularly at bends, and more particularly at twists.

A further additional difficulty is that the steel cans and the steel rods make a great deal of noise together, with consequent damage to the hearing of the cannery workers.

To partly remedy these defects, it has been known to jacket the steel rods with slitted plastic tubing which greatly reduces the noise, corrosion and wear problems, but does nothing to lessen the expense of guide installation and adjustment.

Accordingly, it is an object of the invention to provide a conveyor guide of the parallel-rail chute type that is easier to manufacture, adjust and maintain.

These and other objects are achieved in the present invention by structure in which, for articles such as cylindrical containers or cans, a conveyor guide of the chute type has a number of parallel rails affixed to transverse rib members at intervals along the path of the articles, the ribs in one example being hoop-like rectangular frames arrayed to enclose the moving articles with rails on all the lateral sides. The rails are affixed by means of clamping fasteners each of which is secured to the adjacent rib by a bot piercing the rib normal to the direction of the path. The fastener can rotate on the bolt so as to permit alignment of the rail at an angle to the rib. Thus at bends in the path, or places where the guide twists to change the vertical orientation of the articles, the rails may be smoothly curved to conform to the path without crimping at the fasteners. The rails are made of springy resilient material to assist this effect. The fasteners are relieved, at least on the side facing the ribs, to improve the clamping effect when the bolts are tightened.

DESCRIPTION OF THE DRAWING

FIG. 1 is a side elevation perspective view of a twisted section of conveyor guide in accordance with the invention;

FIG. 2 is a right end elevation perspective view of the twisted guide section of FIG. 1, taken on the plane of lines 2—2 of FIG. 1;

FIG. 3 is an enlarged cross-sectional view of the center top rod and rib of FIGS. 1 and 2, taken on the plane of lines 3—3 of FIG. 2;

FIG. 4 is a bottom view of the structure of FIG. 3 taken on the plane of lines 4—4 of FIG. 3; and FIG. 5 is an enlarged perspective view partly in phantom of an alternative form of part of the structure of FIG. 3.

DESCRIPTION OF THE PREFERRED EMBODIMENTS

Referring now to the drawing and particularly to FIG. 1 thereof, there is shown a segment 11 of a chute-type conveyor guide for articles such as cylindrical cans 12, 13. The guide section comprises six parallel rods or rails 14 affixed at intervals to rib members 16, shown as hooplike rectangular frames encircling the array of rods on the outer sides remote from the path 17 of the cans. Although the rods are shown as curved, it will be understood that the tangents to the curves are parallel at any plane normal to the path 17, or normal to the tangent of path 17, and the rods may thus be rigorously described as being parallel to one another even though curved.

The illustrated guide segment 11 is twisted about the axis of path 17 so that cans entering upright at the right (e.g., can 12) are tilted in vertical orientation during passage through the segment 11 and emerge in tilted condition at the left (e.g., can 13). Ordinarily a twisted segment is used to change the can orientation by at least 90°, but the change here is shown as less for the sake of simplicity and clarity of illustration.

To achieve the structure in the twisted state shown, the rods 14 are first assembled as straight rods with the rib frames 16 all at the same vertical orientation, and the two end frames are then simply grasped by hand and the assembly is twisted to the condition shown. In fact, the drawing FIGS. 1 and 2 are essentially tracings of photographs that were taken of an actual assembly that was set up and twisted by hand as above described. Considering the smoothness of the curves to which the rods have been bent, and considering the difficulties above described in making such bends with prior art structures, it is evident that the inventive structure shown has novel and advantageous features.

One of these features is illustrated particularly in FIGS. 3 and 4, as the fastener 21 by which the rods 14 are affixed to the frames 16 so that each rod can freely align itself at the natural angle $\alpha$ (FIG. 4) to the normal to the plane of the associated frame 16. The fastener has a pair of clamp jaws 22 that enclasp more than half but less than all of the circular periphery of the rod, so that the rod is held securely but passage of the cans is not interfered with. The fastener is then bolted loosely to the frame 16 by means of a bolt 24 that passes freely through an opening in the frame and is threaded into the body of the fastener, and the fastener is free to rotate when the assembly is twisted. Thus the smooth, compound, three-dimensional curves needed in the rods are achieved without the use of a jig such as is required when the rods are to be welded to the frame, and yet the rods are firmly anchored in position during twisting, leaving only the angular adjustment free for change.

Actually in the illustrated assembly, the bolts associated with the middle frame 16 were left loose before twisting; the end frame bolts were tightened while the assembly was still untwisted and the normal alignment of the rods to the planes of the end frames was preserved even after the assembly was twisted.

After twisting, the middle frame bolts were tightened, to lock the fasteners firmly to the frame in their inclined attitudes $\alpha$. Such locking action also serves to preserve the twist in the full assembly, since the twist cannot be removed without altering the inclination $\alpha$.

An important feature of the invention lies in the use of springy, resilient material for the rods 14. A material successfully employed was molybdenum disulphide impregnated nylon, which was available commercially in rod form for use as roller bearing stock, but had not previously been used in conveyor guides. The nylon rods were sufficiently springy to assume the smooth compound curvatures required without kinking or crimping at the various fasteners. In contrast, a set of the prior art stainless steel rods was mounted in the illustrated framework with fasteners 14 and twisted as above described. These rods remained relatively stiff and straight between the frames, but developed sharp, kinky bends at the fasteners to compensate for the twist distortion. This was true even though the middle fasteners were left only loosely bolted prior to the twisting action. Such a kinky structure is entirely unsuitable for can guiding, as cans hitting the sharply crimped portions at high speed tend to stick and are damaged. Evidently the stainless steel is too soft and malleable to be formed without the use of a plywood template jig such as was described above. While high-carbon tempered spring steel might be used, in canneries the expense would not be justified. Besides, there has previously been no way to hold even spring steel rods in position while twisting, except by welding and placing in the well-known wodden jig, which method still resulted in kinked rods.

Among other advantages inhering in the use of nylon rods are, first, the substantial elimination of noise and clatter, and, second, a substantially 10-fold increase in rod life. Furthermore, even though the nylon rods eventually become sufficiently worn to require replacement, it is a simple matter to loosen the appropriate bolts 24 and slip the old rod out and the new one in, without disturbing the remainder of the structure; and replacement of the entire structure is not required as with the prior art welded rods.

With the fasteners 21 it is also a simple matter to abut the ends of rod segments in the middle of a fastener, as shown in FIG. 5.

As an alternative structure, the fastener 21a of FIG. 5 is economically advantageous in that it is formed as an individual transverse segment of an elongated extrusion workpiece 31 (shown in phantom for illustrative purposes).

An important feature of the invention is the formation of the bottom side of the fastener, adjacent the rib 16, with a central groove 32 defining a pair of foot portions 33 facing one another from opposite sides of the central medial plane 34 of the fastener. The bolt 24 is threaded between the foot portions 33 and, when tightened, draws down the center part of the fastener and tends to close the jaws 22 even more tightly on the rod. The jaws 22 also face one another from opposite sides of the same medial plane 34. A slit 36 is formed along the medial plane of the fastener 21, 21a, on the side facing rod 14, to aid the clamping action. Lock washers 37 may also be used to preserve the locked condition of the fastener.

Thus there has been described an apparatus for conveying articles such as cylindrical containers or cans, in which a conveyor guide of the chute type has a number of parallel rails affixed to transverse rib members at intervals along the path of the articles, the ribs in one example being hoop-like rectangular frames arrayed to enclose the moving articles with rails on all the lateral sides. The rails are affixed by means of clamping fasteners, each of which is secured to the adjacent rib by a bolt piercing the rib normal to the direction of the path. The fastener can rotate, or swivel, on the bolt so as to permit alignment of the rail at an angle to the rib. Thus at bends in the path, or places where the guide twists to change the vertical orientation of the articles, the rails may be smoothly curved to conform to the path without crimping at the fasteners. The rails are made of springy resilient material to assist this effect. The fasteners are relieved, at least on the side facing the ribs, to improve the clamping effect when the bolts are tightened.

What is claimed is:

1. In an article conveyor including a conveyor guide of the chute type having a plurality of spaced apart parallel rails supported by transverse rib members at intervals along the conveyor path, the improvement comprising:

a plurality of resilient rails adapted for conforming to bends in the conveyor path without crimping; and
rail fasteners rotatably mounted on said rib members to support said rails at various angles to said rib members at bends in the conveyor path, each of said rail fasteners having;

a pair of clamp jaws separated by a slit for enclasping less than all of the circumference of the corresponding rail; and a pair of spaced apart feet extending from the side of said fastener adjacent to and engaging the corresponding rib member;

said jaws and said feet facing one another respectively from opposite sides of the medial plane of said fastener, each of said fasteners being an individual transverse segment of an elongated workpiece defining said medial plane;

each of said fasteners being threaded to receive a bolt passing freely through a conforming hole in said rib member and threaded into said fastener between said feet, whereby tightening of the bolt strengthens the grip of said jaws and affixes said fastener to said rib member.

2. The combination as recited in claim 1, wherein each rail fastener associated with a given rail may be loosened for selective replacement of said given rail without disassembly of said conveyor guide.

3. The combination as recited in claim 1, wherein said rails comprise nylon rod stock having a circular cross section.

4. The combination as recited in claim 3, wherein said nylon rod stock is impregnated with molybdenum disulphide.

* * * * *

PO-1050
(5/69)

UNITED STATES PATENT OFFICE
CERTIFICATE OF CORRECTION

Patent No. 3,797,624          Dated March 19, 1974

Inventor(s) Johnnie L. Powell and Carl L. Doyle

It is certified that error appears in the above-identified patent and that said Letters Patent are hereby corrected as shown below:

In the title, "Conveyer" is corrected to read --Conveyor--.

In the identification of the assignee, "Mandrel Industries, Inc." is corrected to read --Petty-Ray Geophysical, Inc.--.

Signed and sealed this 1st day of October 1974.

(SEAL)
Attest:

McCOY M. GIBSON JR.
Attesting Officer

C. MARSHALL DANN
Commissioner of Paten